United States Patent [19]

Miller

[11] Patent Number: 5,312,526
[45] Date of Patent: May 17, 1994

[54] METHOD FOR INCREASING OR DECREASING BOND STRENGTH BETWEEN CONCRETE AND EMBEDDED STEEL, AND FOR SEALING THE CONCRETE-TO-STEEL INTERFACE

[76] Inventor: John B. Miller, Bergtunvn 9B, 1087 Oslo 10, Norway

[21] Appl. No.: 121,962

[22] Filed: Sep. 15, 1993

Related U.S. Application Data

[63] Continuation of Ser. No. 854,950, Mar. 23, 1993, abandoned.

[51] Int. Cl.⁵ .............................................. C23F 13/00
[52] U.S. Cl. .................................... 204/130; 204/147; 264/27; 264/36
[58] Field of Search .................. 204/130, 147; 264/22, 264/27, 36, 228

[56] References Cited

U.S. PATENT DOCUMENTS

| | | | |
|---|---|---|---|
| 4,506,485 | 3/1985 | Apostolos | 204/147 |
| 4,832,803 | 5/1989 | Vennesland et al. | 204/147 |
| 4,865,702 | 9/1989 | Miller et al. | 204/147 |
| 5,015,351 | 5/1991 | Miller | 204/130 |
| 5,104,502 | 4/1992 | Mussinelli | 204/147 |

OTHER PUBLICATIONS

"Neutralization Of Chloride In Concrete" by D. R. Lankard, J. E. Slater, W. A. Hedden & D. E. Niesz, Sep. 1975 Final Report, 136 pages.
"Cathodic Protection For Reinforced Concrete Bridge Decks", by John B. Vrable, National Cooperative Highway Research Program Report 180, 17 pages Jul. 1974.

*Primary Examiner*—John Niebling
*Assistant Examiner*—Arun S. Phasge
*Attorney, Agent, or Firm*—Schweitzer Cornman & Gross

[57] ABSTRACT

A process for adjusting the steel-to-concrete bond strength in a hardened concrete structure having embedded steel elements. A source of DC voltage, preferably in the range of 5–40 volts, is connected at its negative side to the embedded steel and at its positive side to an external distributed electrode formed on the surface of the concrete structure. The external electrode may, for example, be a self-adherent electrolytic mass of moist pulp fiber, a conductive coating, or the like. Application of voltage to the structure and the resulting current flow between embedded steel and the external electrode, initially results in a progressive reduction in the steel-to-concrete bond strength. This can be particularly useful in connection with pre-tensioned or post-tensioned structures. Continued application of the voltage results in a progressive increase in bond strength, ultimately reaching a maximum strength significantly above initial values. This is useful in reinforced concrete structures, to improve the bond between the concrete and the reinforcing steel. By reference to pre-established database values, the process may be easily controlled to realize targeted modifications in bond strength. Significant improvement can also be achieved in the sealing of the interface between steel and concrete, to prevent seepage of contaminating liquids or gases along the interface.

8 Claims, 1 Drawing Sheet

METHOD FOR INCREASING OR DECREASING BOND STRENGTH BETWEEN CONCRETE AND EMBEDDED STEEL, AND FOR SEALING THE CONCRETE-TO-STEEL INTERFACE

This is a continuation of application Ser. No. 07/854,950, filed Mar. 23, 1993, now abandoned.

BACKGROUND AND SUMMARY OF THE INVENTION

The present invention relates to a process for the electro-chemical treatment of hardened concrete in order to modify (i.e. by increasing or decreasing) the bond strength between the hardened concrete and internally embedded steel, particularly reinforcing bars, pre-tensioning or post-tensioning rods or cables. Heretofore, this has been impossible, since there has been no known procedure for controllably changing the steel-to-concrete bond, in situ, in hardened concrete.

An additional aspect of the invention involves the modification of the steel-to-concrete interface in a hardened concrete structure to enhance the seal at such interface. Frequently, the interface seal between embedded steel reinforcing or tensioning elements is less than perfect, due to accumulation of bleeding water at the steel surface during the initial hardening of the concrete, or possibly due to insufficient compaction of the concrete when initially poured. Imperfections in the seal at the steel-to-concrete interface can result in seepages, in structures exposed to water pressure, or a possible carbonation of the concrete surfaces adjacent to the steel, with consequent corrosion of the steel.

The present invention is based in part upon the discovery that, during the electro-chemical treatment of concrete, utilizing the internally embedded steel as a cathode, and a distributed electrode structure spaced therefrom, typically at an exposed surface of the concrete, as an anode, a marked and permanent change occurs in the bond between the embedded steel and the surrounding concrete, as a function of the electrical charge applied. During an initial phase of the treatment, there is a progressive and significant reduction in the bond strength to a level far below the initial bond strength. This is followed, with continued treatment, by a progressive and significant increase in bond strength. I have observed that this variation in bond strength is both predictable and repeatable for given types of concrete. Accordingly, by establishing a simple database of relationships between a given treatment time and its effect upon the steel-to-concrete bond strength, it becomes possible to predictably modify such bond strength in an existing structure.

In the case of pre-tensioned or post-tensioned concrete structures, for example, it may be desirable to decrease the bond strength at the steel-to-concrete interface. This would tend to better accommodate flexing of the compressed concrete structural element. With static steel reinforcing bars, on the other hand, it may be desirable to effect an increased bond at the steel-to-concrete interface.

There are known electro-chemical treatments for reinforced concrete, for example, in which the internal steel is connected as a cathode and an external distributed electrode is used as an anode. An example, of such is the Vennesland et al. U.S. Pat. No. 4,832,803. Such known procedures, however, are intended for use in the rehabilitation of concrete structures which have become contaminated with chlorides, for example, or where conditions have become corrosive to the internally embedded steel, through carbonation or otherwise. While the techniques of the invention might still be usefully employed even in connection with contaminated concrete, the treatment of the invention is not a rehabilitative process, but is directed to controlling and modifying the bond at the steel-to-concrete interface. In the process of the present invention, treatment conditions and controlling parameters are altogether different than for rehabilitation.

For a more complete understanding of the above and other features and advantages of the invention, reference should be made to the following detailed description of preferred practices of the invention, and to the accompanying drawings.

DESCRIPTION OF PREFERRED EMBODIMENTS

Figure 1:
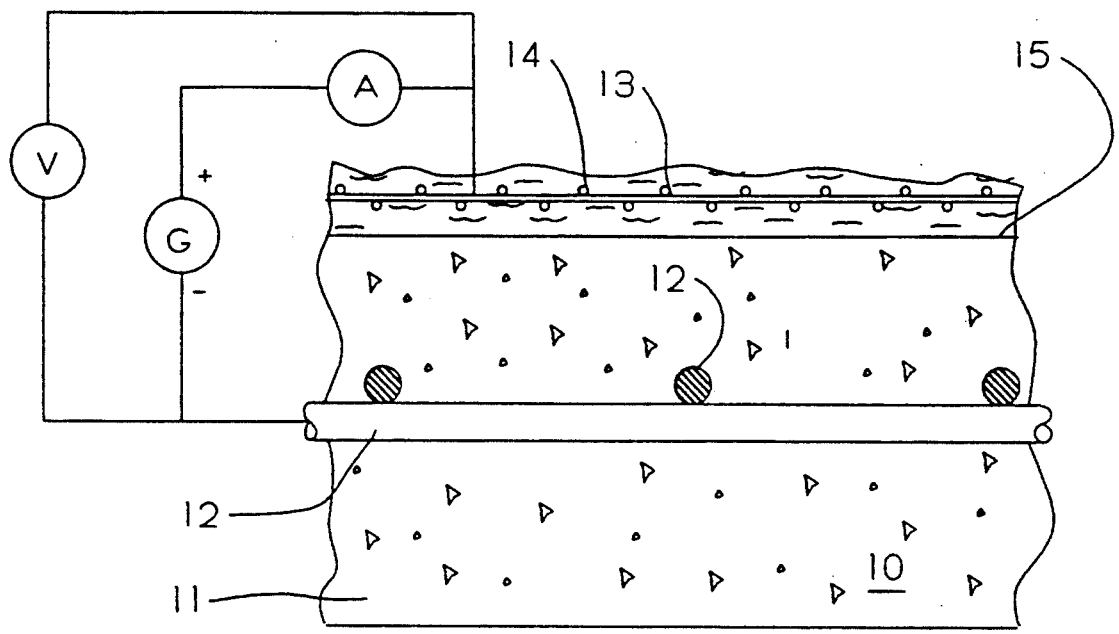
FIG. 1 is a simplified cross sectional illustration of a concrete structure illustrating the practice of the invention.

In accordance with the invention, bonding at the steel-to-concrete interface is modified by passing an electrical current between the embedded steel and a distributed electrode associated with the concrete, at a location spaced from the embedded steel. FIG. 1 shows a typical and advantageous arrangement for the accomplishment of that objective. In FIG. 1, the reference numeral 10 designates a reinforced (or pre-tensioned or post-tensioned) concrete structure. In the illustration, a concrete body is provided with a plurality of reinforcing bars 12, which are embedded in and surrounded by the concrete.

A source "G" of DC voltage is connected at its negative side to the embedded steel elements 12 and at its positive side to a distributed electrode element 13, which may be in the form of a conductive wire mesh, for example of steel or titanium. In the illustrated system, the electrode element 13 is embedded in an electrolytic mass 14, which advantageously may be a cellulosic pulp fiber, for example, maintained moist with water or electrolytic solution. Where the cellulosic pulp fiber is employed, it typically is sprayed onto the outer surface 15 of the concrete 11 in a two layers. The fibrous material is self-adherent to the surface of the concrete, and thus may be applied to vertical or even downwardly facing surfaces After applying the first layer, the mesh electrode 13 is installed, and a second layer of the fiber is applied over the top of the electrode, substantially as shown in FIG. 1.

The particular form of distributed electrode is not significant to the invention. Where the character and orientation of the concrete admits, the electrode 13 may be submerged in a pool of liquid, or embedded in a wet, spongy mass or blanket, for example. Likewise, where appropriate, the surface of the concrete may be coated with a conductive layer (or placed in contact with a conductive foil). The principal requirement, for the purposes of the present invention, is to provide an area-distributed electrode arrangement, to accommodate a distributed flow of electricity between the internally embedded steel elements 12 and the opposite electrode.

The operating capacity of the voltage source "G" is not critical. Practical considerations, however, suggest that DC voltage be made available at from about 5 to about 40 volts DC, preferably adjustable. 40 volts is a convenient upper limit for safety purposes. The system desirably has a sufficient current capacity to deliver between 0.5 and 10 amps of current, per square meter of surface area of the embedded steel in the area being processed.

Figure 2:
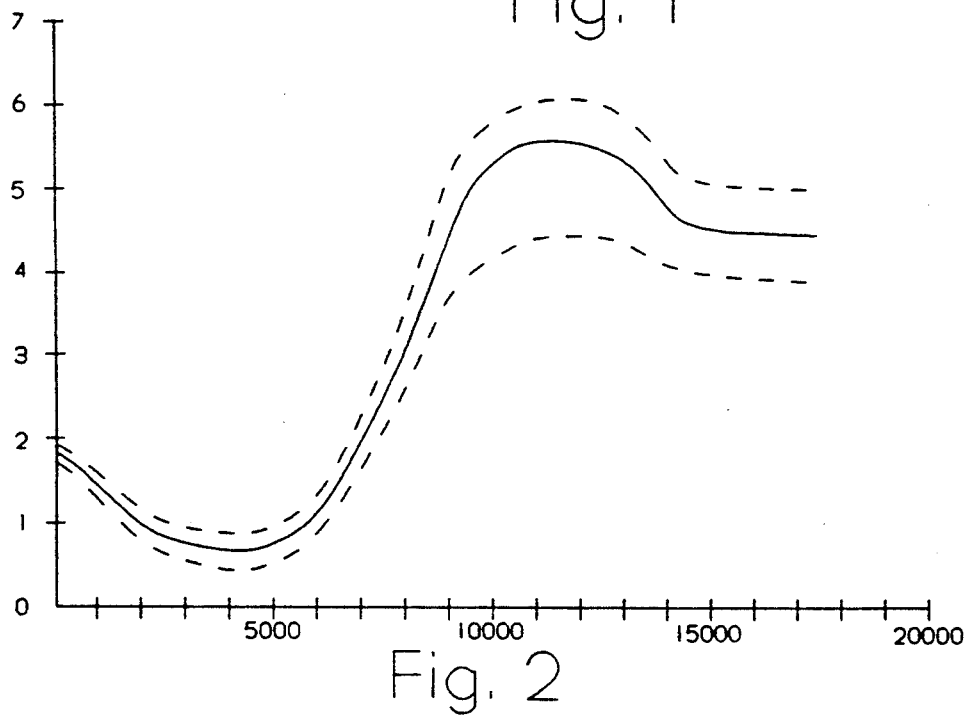
FIG. 2 ia a representative graph illustrating the relationship between treatment time according to the invention and its effect upon the bond strength between concrete and steel embedded therein.

With reference to FIG. 2 of the drawings, there is shown a typical curve of values of steel-to-concrete bond strength, in MPa (MegaPascals) in relation to the total electrical charge applied to the embedded steel, in terms of ampere-hours per square meter of surface area of the steel. In the illustration of FIG. 2, the solid line represents an average of values for a concrete of typical composition. The upper and lower dotted lines represent typical deviations from the average values represented by the solid line.

As will be evident in FIG. 2, during the first stages of processing in accordance with the present invention, and up to a point where between 4000 and 5000 ampere hours per square meter of steel surface area have been caused to flow, the bond strength between the embedded steel and the surrounding concrete progressively diminishes. In the illustration, the starting bond strength is approximately 1.8 MPa, and this progressively reduces to a value of around 0.6–0.7 MPa, after a current flow of around 4300 ampere hours per square meter of steel surface area.

Upon continued flow of current between the embedded steel and the distributed anode, bond strength between the embedded steel and the surrounding concrete begins to increase. With continued current flow, the bond strength increases dramatically above initial levels, finally reaching a maximum limit. In the data illustrated in FIG. 2, maximum bond strength is reached at a level of about 5.7 MPa, after current flow of approximately 12,000 ampere hours per square meter of surface area of embedded steel.

After reaching its maximum values, bond strength again begins to decrease with continued current flow, although it ultimately levels off and becomes relatively stable at current flow in the range of 14,000–15,000 ampere hours per square foot of surface area. Normally, there would be no reason to carry the process beyond the point of maximum bond strength. Indeed, it may be detrimental to do so.

The data reflected in FIG. 2 of the drawings, represents a smoothed-out curve based upon actual data readings from a concrete of average quality. Similar databases can be developed for any specific concrete mixture, although the curve of FIG. 2 is suitable for most practical cases.

In the course of treatment in accordance with the invention, it is observed that, when treatment has continued to the point where bond strength has increased above initial values, the interstices of the concrete, at the steel-to-concrete interface and immediately adjacent thereto, have been impregnated with substances produced by the electro-chemical reactions at the steel surface. These are thought to be mixtures of various compounds, including calcium hydroxide and calcium carbonate. This impregnation with reaction compounds, renders the interface zone impervious and sealed, for all practical purposes.

The process of the invention achieves remarkable and unexpected results in enabling for the first time, the in situ modification of steel-to-concrete bond strength in a hardened concrete structure. Depending upon the requirements of a particular installation, the bond strength may be controllably decreased, as may be desired in installations utilizing pre-tensioned and post-tensioned tendons, or increased, as in the case of standard static reinforcing bars embedded in a typical concrete structure. A database of values for a typical concrete composition is easily produced and can serve acceptably for most types of concrete. For particularly critical structures and/or for unique concrete formulations, a relatively simple set of tests can be performed to establish a specific database of values for a specific composition of concrete. These values can then be followed in controlling the process as applied to a particular structure utilizing the special composition.

In addition to providing for precise modification and control of steel-to-concrete bond strength, the process of the invention also can be utilized to effectively seal the steel-to-concrete interface against the ingress of water and atmosphere. This is the result of a precipitation of reaction products in the interstices of the concrete at and immediately surrounding the steel-to-concrete interface, which makes the concrete in this area relatively impenetrable to external liquids and gases.

The process of the invention is simple and economical to apply, and utilizes known technology and known equipment. In a typical case, the external electrode means can be installed on an exterior surface of the structure and then washed away or otherwise removed upon completion of the procedure.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. The process of controllably increasing or decreasing the bond strength between a body of set and cured concrete and internally embedded steel which comprises,
   (a) providing a source of DC voltage,
   (b) connecting said internally embedded steel to a negative terminal of said voltage source,
   (c) forming a distributed electrode means in association with said concrete body,
   (d) connecting said distributed electrode means to a positive terminal of said voltage source,
   (e) establishing, if necessary, and providing a data base, applicable to said concrete, indicating progressive relationships between increasing and decreasing steel-to-concrete bond strengths and total electrical flow between said steel and said distributed electrode means, per unit area of said embedded steel,
   (f) determining in advance a desired increase or decrease in the bond strength of said embedded steel to said concrete and ascertaining from said data base the required current flow per unit of embedded steel to achieve such desired modification,
   (g) causing said voltage source to effect a current flow between said embedded steel and said distributed electrode means, and (h) terminating said process when the total electrical flow per unit of said steel is such, as calculated from said data base, to impart said desired increase or decrease in the bond strength of said embedded steel to said concrete and in all cases before the total electrical flow substantially exceeds that which achieves a maximum increase in bond strength.

2. A process according to claim 1, further characterized by
(i) said data base is provided to indicate progressive relationships between total current charge per unit of surface area of the embedded steel and steel-to-concrete bond strength.

3. A process according to claim 1, further characterized by
(i) said process terminated at a point at which the total electrical charge provided to said embedded steel is such as to effect a desired reduction of bond strength between said steel and said concrete.

4. A process according to claim 1, further characterized by
(i) said process being terminated at a point at which the total electrical charge provided to said embedded steel is such as to effect a desired increase of bond strength between said steel and said concrete.

5. A process according to claim 4, further characterized by
(i) said process being continued sufficiently to effect significant sealing of the steel-to-concrete interface by filing of interstices of the surrounding concrete with reaction products of the electro-chemical treatment.

6. A process according to claim 1, further characterized by
(i) said voltage source providing from about 5 to about 40 volts DC with sufficient capacity to deliver from about 0.5 to about 10 amperes per square meter of surface area of the embedded steel under treatment.

7. A process according to claim 1, further characterized by
(i) said embedded steel comprising tension elements for maintaining surrounding concrete under compression, and
(i) said process is controlled to reduce bond strength between said tension elements and said concrete.

8. A process according to claim 1, further characterized by
(i) said embedded steel comprising untensioned reinforcing elements, and
(i) said process is controlled to increase bond strength between said tension elements and said concrete.

* * * * *